(12) United States Patent
Sun

(10) Patent No.: US 11,019,515 B1
(45) Date of Patent: May 25, 2021

(54) METHOD AND APPARATUS FOR PERFORMING CLIENT STEERING CONTROL IN MULTI-ACCESS POINT NETWORK

(71) Applicant: Realtek Singapore Private Limited, Singapore (SG)

(72) Inventor: Chaohai Sun, Singapore (SG)

(73) Assignee: Realtek Singapore Private Limited, Singapore (SG)

( * ) Notice: Subject to any disclaimer, the term of this patent is extended or adjusted under 35 U.S.C. 154(b) by 31 days.

(21) Appl. No.: 16/735,558

(22) Filed: Jan. 6, 2020

(51) Int. Cl.
| | |
|---|---|
| *H04L 12/26* | (2006.01) |
| *H04W 24/08* | (2009.01) |
| *H04W 84/10* | (2009.01) |
| *H04W 88/10* | (2009.01) |
| *G06F 16/23* | (2019.01) |
| *H04B 17/318* | (2015.01) |
| *H04W 88/08* | (2009.01) |

(52) U.S. Cl.
CPC ........ *H04W 24/08* (2013.01); *G06F 16/2379* (2019.01); *H04B 17/318* (2015.01); *H04L 43/16* (2013.01); *H04W 84/10* (2013.01); *H04W 88/08* (2013.01)

(58) Field of Classification Search
CPC ..... H04W 24/08; H04W 84/10; H04W 88/10; H04B 17/318; H04L 43/16; G06F 16/2379
USPC .......................................................... 370/252
See application file for complete search history.

(56) References Cited

U.S. PATENT DOCUMENTS

| | | | |
|---|---|---|---|
| 2009/0010222 A1* | 1/2009 | Jechoux | H04W 36/30 370/331 |
| 2018/0213412 A1* | 7/2018 | Makati | H04W 16/26 |
| 2018/0227784 A1* | 8/2018 | Kim | H04W 36/14 |
| 2019/0215841 A1* | 7/2019 | Sugaya | H04W 88/08 |

* cited by examiner

*Primary Examiner* — Gbemileke J Onamuti
(74) *Attorney, Agent, or Firm* — Winston Hsu

(57) ABSTRACT

A method for performing client steering control in a multi-AP network and associated apparatus are provided. The method includes: utilizing a controller of a controller-agent-client architecture of the multi-AP network to obtain multiple metrics from interactions between logical entities of the controller-agent-client architecture; calculating Basic Service Set (BSS) scores of a set of BSSs according to the multiple metrics, respectively, for selecting a best BSS from the set of BSSs according to the BSS scores; and in response to a time measurement count reaching a predetermined threshold, utilizing the controller to trigger at least one operation related to at least the agents, to allow the best BSS to be selected as a target BSS for roaming, thereby enhancing overall performance of the multi-AP network, wherein the time measurement count corresponds to length of time that the best BSS keeps having highest score of the BSS scores.

20 Claims, 4 Drawing Sheets

METHOD AND APPARATUS FOR PERFORMING CLIENT STEERING CONTROL IN MULTI-ACCESS POINT NETWORK

BACKGROUND OF THE INVENTION

1. Field of the Invention

The present invention is related to wireless networks, and more particularly, to a method and apparatus for performing client steering control in a multi-access point (AP) network.

2. Description of the Prior Art

According to the related art, multiple APs may be connected or configured together in a home network. As a certain specification of the Wi-Fi Alliance® provides control protocols between APs as well as data objects for associated control, devices conforming to this specification may be helpful on implementing the home network. However, some problems may occur. For example, although the specification may have specified the message exchange, it lacks implementation details regarding client steering, etc. Hence, there is a need for a novel method and associated architecture to enhance the overall performance without introducing a side effect or in a way that is less likely to introduce a side effect.

SUMMARY OF THE INVENTION

It is therefore an objective of the present invention to provide a method for performing client steering control in a multi-AP network, and to provide associated apparatus (e.g. a wireless communications device, a processing circuit within the wireless communications device, etc.), in order to solve the above-mentioned problems.

At least one embodiment of the present invention provides a method for performing client steering control in a multi-AP network. The method may comprise: utilizing a controller of a controller-agent-client architecture of the multi-AP network to obtain multiple metrics from interactions between at least one portion of multiple logical entities of the controller-agent-client architecture, wherein the multiple logical entities comprise the controller, multiple agents, and multiple clients, and said at least one portion of the multiple logical entities comprises the controller and the multiple agents; calculating Basic Service Set (BSS) scores of a set of BSSs according to the multiple metrics, respectively, for selecting a best BSS from the set of BSSs according to the BSS scores, wherein any BSS of the set of BSSs comprises an AP equipped with an agent and a non-AP station (STA) playing a role of a client, and multiple factors of a BSS score of said any BSS comprise a received signal strength indicator (RSSI) metric and a path metric; and in response to a time measurement count reaching a predetermined threshold, utilizing the controller to trigger at least one operation related to at least the agents, to allow the best BSS to be selected as a target BSS for roaming, thereby enhancing overall performance of the multi-AP network, wherein the time measurement count corresponds to a length of time that the best BSS keeps having a highest score of the BSS scores.

In addition to the above method, the present invention also provides an apparatus for performing client steering control in a multi-AP network. The apparatus may comprise a processing circuit that is positioned in a wireless communications device, and the processing circuit may be arranged to control operations of the wireless communications device, where the processing circuit may comprise multiple modules respectively corresponding to multiple functions of the wireless communications device. The multiple modules may comprise a controller of a controller-agent-client architecture of the multi-AP network, wherein multiple logical entities of the controller-agent-client architecture comprise the controller, multiple agents, and multiple clients. The multiple modules may further comprise a first agent of the multiple agents, wherein the controller and the first agent are implemented within the wireless communications device in the multi-AP network to form one of multiple APs in the multi-AP network. For example, the processing circuit may utilize the controller to obtain multiple metrics from interactions between at least one portion of the multiple logical entities, wherein said at least one portion of the multiple logical entities comprises the controller and the multiple agents; the processing circuit may calculate BSS scores of a set of BSSs according to the multiple metrics, respectively, for selecting a best BSS from the set of BSSs according to the BSS scores, wherein any BSS of the set of BSSs comprises an AP equipped with an agent and a non-AP STA playing a role of a client, and multiple factors of a BSS score of said any BSS comprise an RSSI metric and a path metric; and in response to a time measurement count reaching a predetermined threshold, the processing circuit may utilize the controller to trigger at least one operation related to at least the agents, to allow the best BSS to be selected as a target BSS for roaming, thereby enhancing overall performance of the multi-AP network, wherein the time measurement count corresponds to a length of time that the best BSS keeps having a highest score of the BSS scores.

The present invention method and associated apparatus can guarantee that the whole network can operate properly, to prevent problems in the related art. More particularly, the present invention method and apparatus can balance the network load between agents and optimize client roaming. In addition, implementing the embodiments of the present invention will not significantly increase the cost. Therefore, the related art problems can be solved, and the overall cost will not increase too much. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
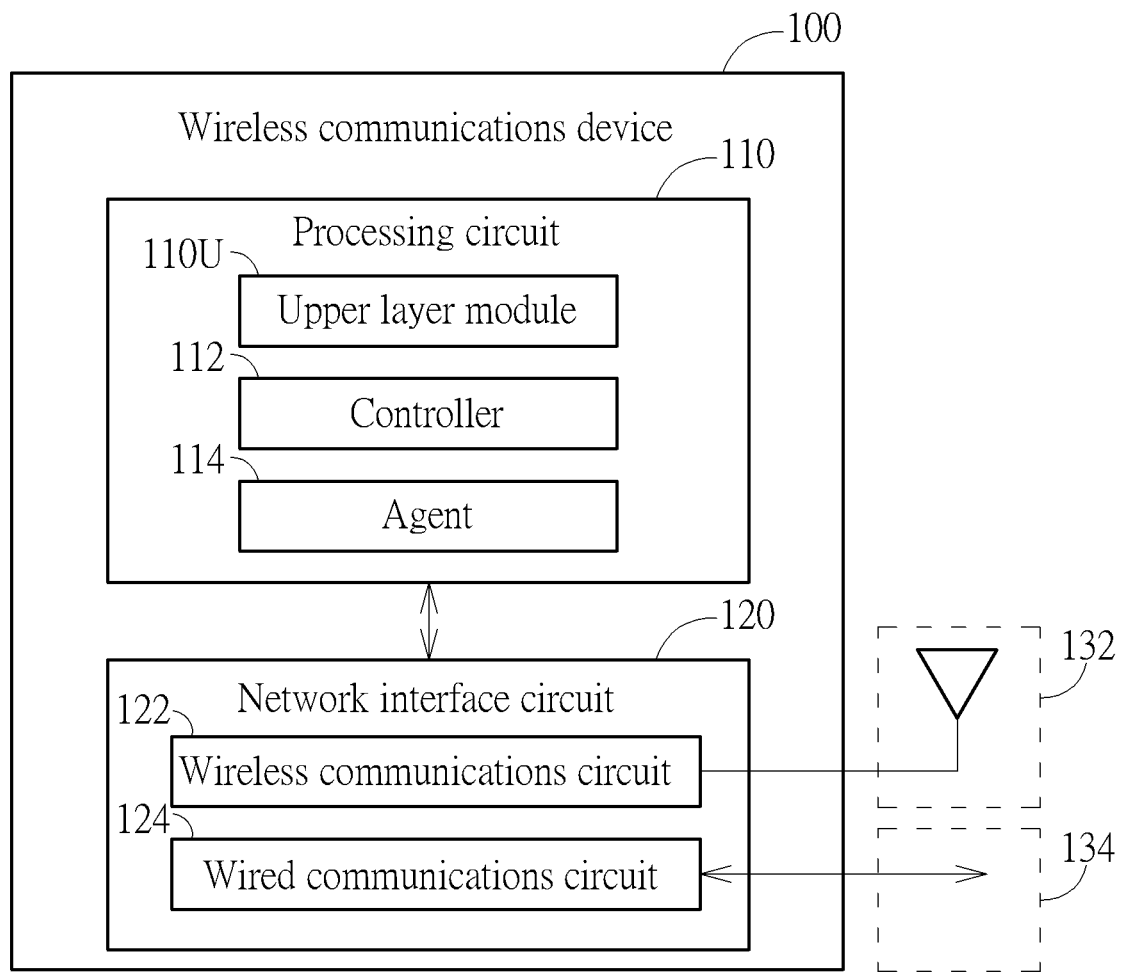
FIG. 1 is a diagram of an apparatus for performing client steering control in a multi-AP network according to an embodiment of the present invention.

FIG. 1 is a diagram of an apparatus for performing client steering control in a multi-AP network according to an embodiment of the present invention. The apparatus may comprise at least one portion (e.g. a portion or all) of a wireless communications device 100, such as a processing circuit 110 that is positioned in the wireless communications device 100 or the whole of the wireless communications device. The processing circuit 110 may be configured to control operations of the wireless communications device 100, and a wireless communications circuit 122 and a wired communications circuit 124 in a network interface circuit 120 may be configured to perform wireless and wired communications operations through one or more antennas 132 and a network cable 124, respectively. For example, the processing circuit 110 and the network interface circuit 120 may be implemented by way of one or more processors, one or more application-specific integrated circuits (ASICs), one or more chipsets, etc.

The processing circuit 110 may comprise multiple modules respectively corresponding to multiple functions of the wireless communications device 100, and the multiple modules may comprise a controller 112 and an agent 114 of a controller-agent-client architecture of the multi-AP network, where multiple logical entities of the controller-agent-client architecture may comprise the controller 112, multiple agents comprising the agent 114, and multiple clients. The controller 112 and the agent 114 may be implemented within the wireless communications device 100 in the multi-AP network to form one of multiple APs in the multi-AP network, and another agent of the multiple agents may be implemented within another wireless communications device in the multi-AP network to form another of the multiple APs.

Figure 2:
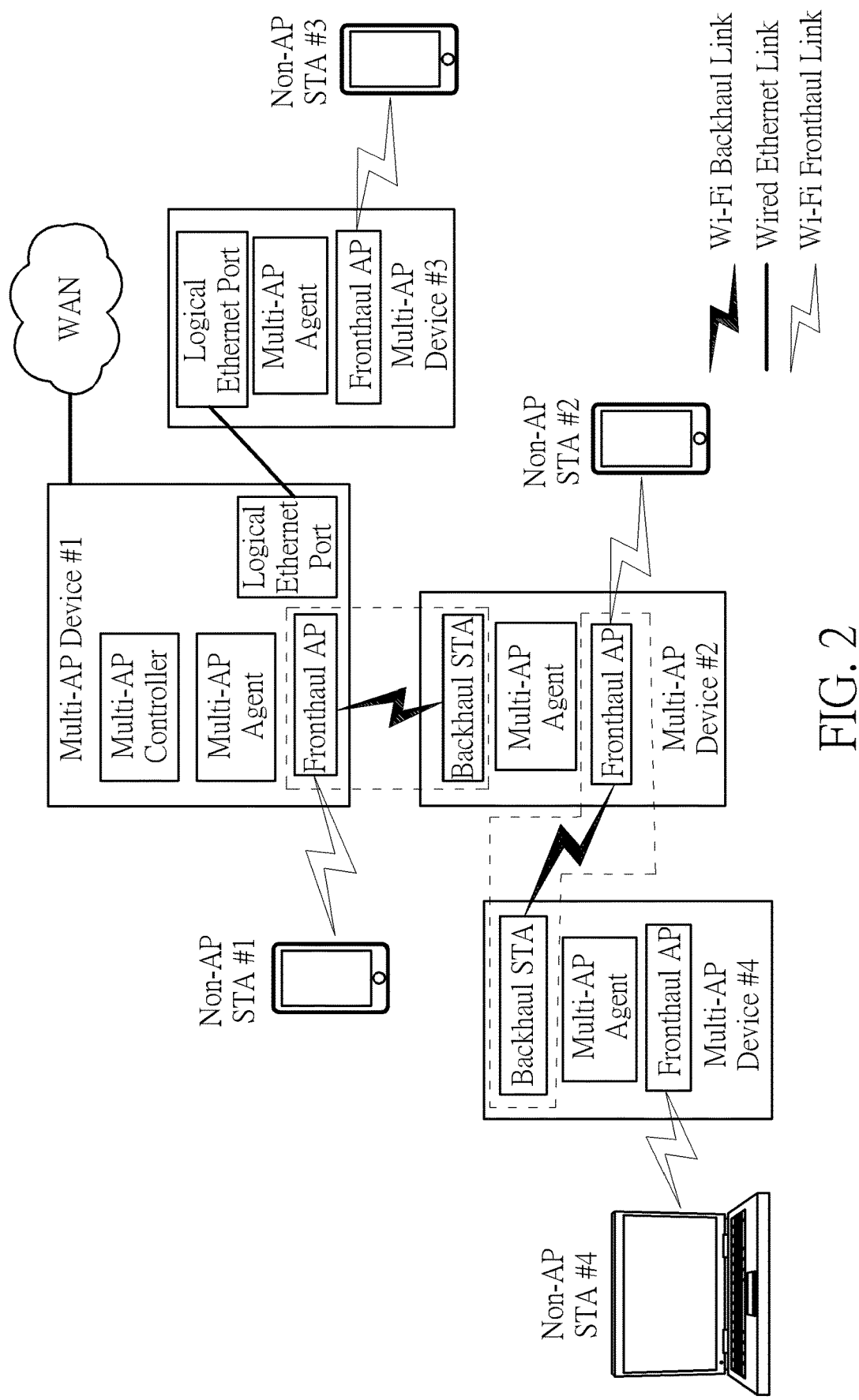
FIG. 2 illustrates an example of the multi-AP network.

FIG. 2 illustrates an example of the multi-AP network. The multi-AP network may comprise multi-AP devices #1, #2, #3 and #4 conforming to the multi-AP (MAP) specification of the Wi-Fi Alliance®, and the multi-AP device #1 (e.g. a primary gateway device) coupled to a wide area network (WAN) and any of the multi-AP devices #2, #3 and #4 may be taken as examples of the wireless communications device 100 and the other wireless communications device, respectively, where the multi-AP controller and the multi-AP agent in the multi-AP device #1 may be taken as examples of the controller 112 and the agent 114, respectively, and the multi-AP agents of the multi-AP devices #1, #2, #3 and #4 may be taken as examples of the multiple agents. The non-AP STAs #1, #2, #3 and #4 (e.g. multifunctional mobile phones, tablets, laptops, etc.) may play the roles of the multiple clients. Fronthaul APs, backhaul STAs, and logical Ethernet ports may be implemented in this architecture, to allow establishment of Wi-Fi backhaul links, wired Ethernet links, Wi-Fi fronthaul links, etc. Regarding the associated control of communications between these devices, please refer to the multi-AP specification for some implementation details.

Based on the architecture shown in FIG. 2, the processing circuit 110 may utilize the controller 112 such as the multi-AP controller to control the fronthaul APs and backhaul links in the multi-AP network. In addition, the processing circuit 110 may utilize the controller 112 such as the multi-AP controller to send commands to any agent of the multiple agents, such as a certain multi-AP agent, to make the multi-AP agent execute the commands and report measurements and capabilities data for fronthaul APs, clients and backhaul links to the multi-AP controller and/or to other multi-AP agents.

According to some embodiments, when one or more additional multi-AP devices are added into the multi-AP network, the controller 112 may perform associated configuration of the one or more additional multi-AP devices to expand the architecture shown in FIG. 2 and increase the coverage of the wireless network service. In addition, the processing circuit 110 (e.g. one or more upper layer modules 110U of the multiple modules, in an upper layer above the controller 112) may interact with multi-AP agents through the controller 112, to perform steering control according to system wide Wi-Fi information.

Figure 3:
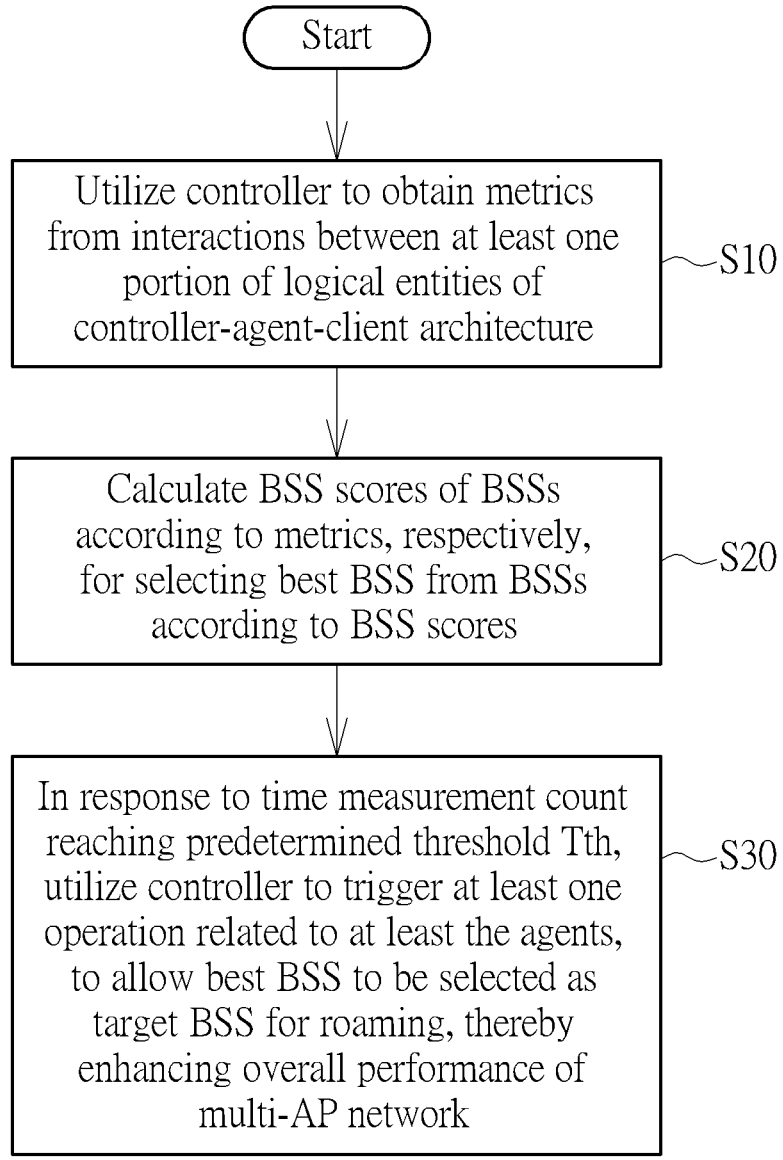
FIG. 3 is a working flow of a method for performing client steering control in a multi-AP network according to an embodiment of the present invention.

FIG. 3 is a working flow of a method for performing client steering control in a multi-AP network according to an embodiment of the present invention. The method may be applied to the apparatus shown in FIG. 1 (e.g. the wireless communications device 100 and the processing circuit 110 therein), and more particularly, the architecture shown in FIG. 2.

In Step S10, the processing circuit 110 may utilize the controller 112 to obtain multiple metrics from interactions between at least one portion (e.g. a portion or all) of the multiple logical entities of the controller-agent-client architecture. For example, the aforementioned at least one portion of the multiple logical entities may comprise the controller 112 and the multiple agents, and more particularly, may further comprise the multiple clients when there is a need.

In Step S20, the processing circuit 110 (e.g. the one or more upper layer modules 110U and/or the controller 112) may calculate BSS scores of a set of BSSs according to the multiple metrics, respectively, for selecting a best BSS from the set of BSSs according to the BSS scores, where any BSS (e.g. each BSS) of the set of BSSs may comprise an AP equipped with an agent and a non-AP STA playing a role of a client, such as an AP and a non-AP STA having a Wi-Fi fronthaul link between them in FIG. 2. Regarding the BSS scores, multiple factors of a BSS score of the any BSS may comprise an RSSI metric and a path metric. The RSSI metric and the path metric may indicate a signal strength at the client and a total distance on a transmission path between this agent and the controller 112 in the controller-agent-client architecture, respectively. For example, the RSSI metric may have a positive correlation with (e.g. be in proportion to) the signal strength, and the path metric may have a negative correlation with (e.g. be in inverse proportion to) the total distance.

In Step S30, in response to a time measurement count reaching a predetermined threshold Tth, the processing circuit 110 may utilize the controller 112 to trigger at least one operation related to at least the agents, to allow the best BSS to be selected as a target BSS for roaming, thereby enhancing overall performance of the multi-AP network, where the time measurement count may correspond to a length of time that the best BSS keeps having a highest score of the BSS scores, and therefore may be referred to as the best BSS count according to some viewpoints. The predetermined threshold Tth may represent a predetermined length of time, such as 20 seconds or any other length of time.

For better comprehension, the method may be illustrated with the working flow shown in FIG. 3, but the present invention is not limited thereto. According to some embodiments, one or more steps may be added, deleted, or changed in the working flow shown in FIG. 3. For example, the processing circuit 110 (e.g. the one or more upper layer modules 110U and/or the controller 112) may update a metric database according to the multiple metrics, to make the metric database comprise the multiple metrics, for use of calculating the BSS scores.

In addition, the multiple factors of the BSS score may further comprise one or any combination of a channel utilization metric (e.g. a metric indicating channel loading detected by the agent), a station number metric (e.g. a metric indicating a number of non-AP STAs linked to the AP), and a station throughput metric (e.g. a metric indicating current throughput of the non-AP STA). For example, the BSS score may be a linear combination of the multiple factors (e.g. the five types of metrics listed above). The processing circuit 110 may multiply the multiple factors and respective weightages (e.g. weighting parameters) thereof to generate multiple products, respectively, and calculates a summation of the multiple products to be the BSS score.

Additionally, the processing circuit 110 may obtain the multiple metrics by way of instant measurement, previous measurement, historical statistics, etc. For example, the any BSS may represent a current BSS of a target non-AP STA (e.g. a non-AP STA having the need of linking to the best BSS), and the processing circuit 110 may utilize the target non-AP STA to measure the signal strength according to signals (e.g. packets) between the target non-AP STA and the AP of the current BSS, to determine the RSSI metric through instant measurement. For another example, the any BSS may represent another BSS differing from the current BSS, and the processing circuit 110 may utilize one or more existing non-AP STAs in the other BSS to measure the signal strength according to signals (e.g. packets) between the one or more existing non-AP STAs and the AP of the other BSS, to determine the RSSI metric through instant measurement. For yet another example, the one or more existing non-AP STAs may be replaced by one or more previous non-AP STAs previously associated with the AP of the other BSS, and therefore, the processing circuit 110 may determine the RSSI metric through previous measurement or historical statistics. Similarly, the processing circuit 110 may determine other types of metrics in the multiple metrics through instant measurement, previous measurement, historical statistics, etc.

Figure 4:
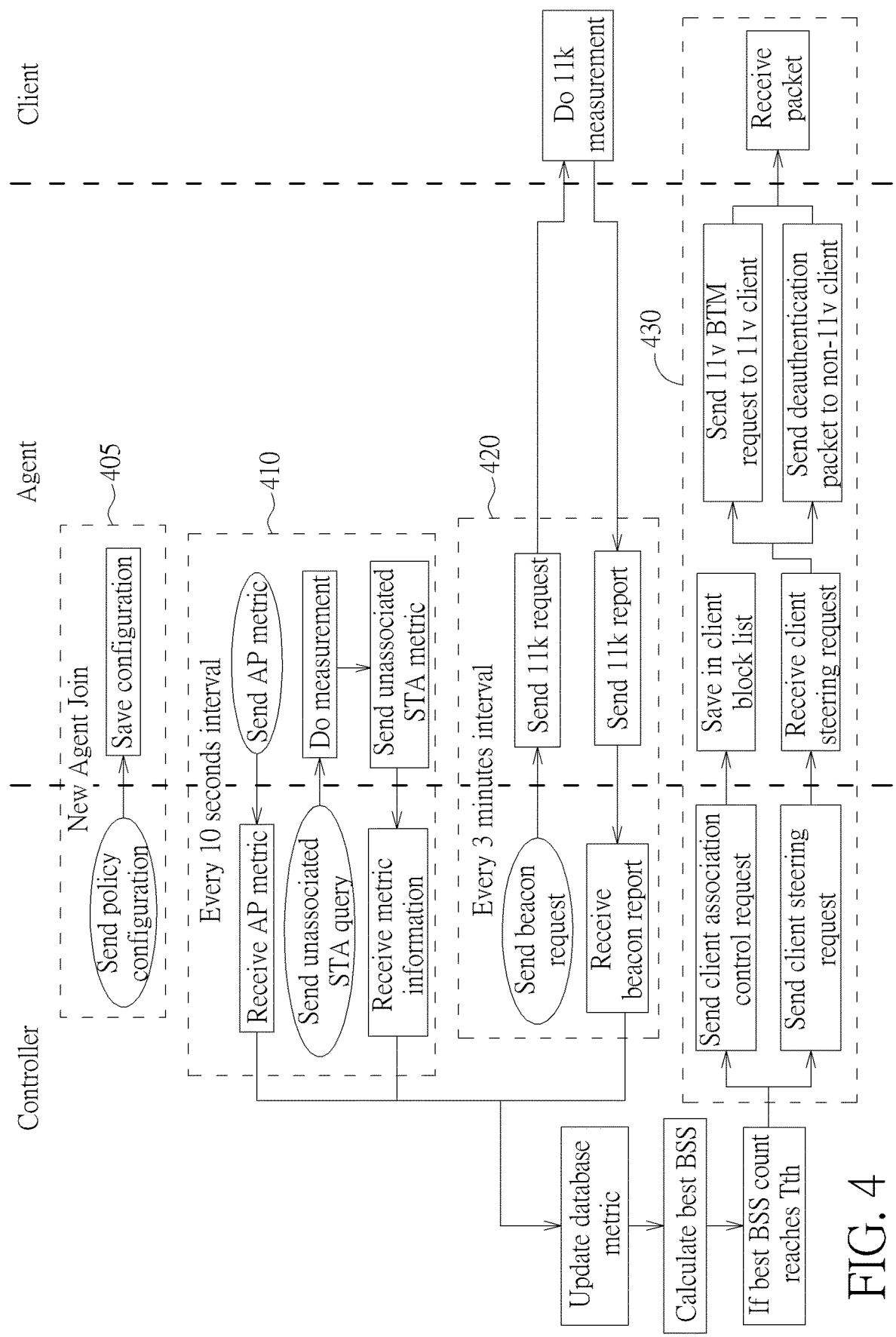
FIG. 4 illustrates a control scheme of the method according to an embodiment of the present invention.

FIG. 4 illustrates a control scheme of the method according to an embodiment of the present invention. The controller-agent-client architecture may comprise a controller layer, an agent layer and a client layer (labeled "Controller", "Agent" and "Client" on top of FIG. 4 for brevity) respectively comprising the controller 112, the multiple agents and the multiple clients. Some operations shown in FIG. 4 may conform to IEEE 802.11 specifications, and more particularly, IEEE 802.11k and IEEE 802.11v specifications, which may be respectively referred to as "11k" and "11v" hereinafter for brevity.

Regarding operations 405 for managing new agent join, the processing circuit 110 (e.g. the controller 112) may send policy configurations to the agents, and the agents may save the configurations. Operations 410 performed every 10 seconds interval may be taken as examples of the interactions between the portion of the multiple logical entities, and the operations 410 and operations 420 performed every 3 minutes interval may be taken as examples of the interactions between all of the multiple logical entities. In the operations 410, the processing circuit 110 (e.g. the controller 112) receives AP metrics when the agents send the AP metrics, and sends unassociated STA query to make the agents do measurement and send unassociated STA metrics, and the controller 112 receives the unassociated STA metrics as metric information, for being utilized as the multiple metrics. In the operations 420, the processing circuit 110 (e.g. the controller 112) sends beacon requests to the agents to make the agents send 11k requests to the clients, so the clients do 11k measurement and return measurement results to the agent, and the agents send 11k reports to the controller 112 and the controller 112 receives the 11k reports as beacon reports, for being utilized as replacement of some of the multiple metrics. For example, the processing circuit 110 may obtain respective RSSI, path, channel utilization, station number, and station throughput metrics of the BSSs from the operations 410, and may obtain more accurate versions of the RSSI metrics and the path metrics from the operations 420, for replacing their previous versions obtained from the operations 410.

As shown in the lower left of FIG. 4, the processing circuit 110 may update database metrics in the metric database according to the multiple metrics obtained from the operations 410 and 420, calculate the best BSS, and, if the best BSS count reaches the predetermined threshold Tth, trigger the aforementioned at least one operation related to at least the agents (e.g. operations 430). In the operations 430, the processing circuit 110 (e.g. the controller 112) sends client association control requests to the agents to allow the agents to save in a client block list, for blocking low performance BSSs, and sends client steering requests to the agents. After receiving the client steering requests, the agents may send packets corresponding to different types of clients, for example, send 11v BSS Transition Management (BTM) requests to 11v clients such as client STAs which support IEEE 802.11v BTM and send deauthentication packets to non-11v clients such as client STAs which do not support IEEE 802.11v BTM, so the clients receive the packets to operate under control of the agents. Regarding control messages for steering of the client STAs, please refer to the multi-AP specification for some implementation details. For brevity, similar descriptions for this embodiment are not repeated in detail here.

According to some embodiments, some implementation details related to the method may be described as follows.
1.0 Metric Information Collection Information about the network is collected using the following EasyMesh™ messages:
  (1) AP Metrics Response message
  (2) Unassociated STA Link metric query/Unassociated STA Link metric response
  (3) Beacon Metric Request message/Beacon Metric Response message
1.1 AP Metrics Response message The AP Metrics Response message is sent by every agent to the controller every 10 seconds. This behavior is preset on each agent whenever it joins the network as the controller will send it a policy configuration request specifying a set of behaviors which the agent need to abide. It will contain the following TLVs and the respective information:
  (1) AP Metrics TLV
    (1a) Channel utilization detected by the BSS
  (2) Associated STA Link Metric TLV
    (2a) Associated STA RSSI
1.2 Unassociated STA Link Metric Query/Response Message All agents in the network will be requested to report the Unassociated STA Link metric of stations heard in the network every 10 seconds. Agents will report the RSSI value requested client devices that are detected.
1.3 Beacon Metric Request/Response Message For 11k supported clients, the controller will request agents to issue 11k beacon measurement request to theirs clients for collection of information about the network. This information collection is from the client's perspective and may come in handy for detecting other Access Points which are not visible by devices in the current ESS. In the Beacon measurement report obtained from clients, we get each client's perspective of the detected BSS around it, if the RCPI reported is higher than the existing associated BSS, the client will be processed for roaming with that 11k reported BSS as the target.

2.0 BSS Score Calculation

The BSS score is calculated for each BSS of each device in the network that is deemed suitable as a roaming target.

Factors included in the calculation of the BSS score are:

(1) RSSI metric—RSSI measured between the client and agent (2) Path metric—Path score of the agent with respect to distance from controller (3) Channel utilization metric—Channel loading detected by agent (4) Station number metric—Associated station number on the agent (5) Station throughput metric—Station current throughput BSS Score=(RSSI metric*RSSI weightage)+(Path metric*weightage)+(Channel Utilization metric*weightage)+(Station number metric*weightage)+(Station throughput metric*weightage)

3.0 Pre-Roam Conditions

A mobile client must meet the pre-roam conditions before it is eligible for roaming evaluation. These conditions are implemented as an effort to provide the best user experience.

3.1 Associated Link Time

The default associated link time is 3 minutes. This means that a client must be associated to an agent for a minimum of 3 minutes before it will be eligible for roam evaluation. It serves as a protection mechanism against iOS devices which have a tendency of not re-associating with any device in the network if the device was processed for roaming too frequently.

3.2 Better BSS

For a BSS to be acknowledged as a better BSS, the difference between its BSS score and the currently associated mobile client BSS score has to be greater than the roam score difference, which by default is 20. This requirement is implemented to reduce frequent roaming trigger due to edge cases and roaming should only be triggered provided a significantly better BSS is found.

3.3 Best BSS Count

A best BSS will only be selected as target BSS for roaming after it has been consistently identified as best BSS for 20 seconds. This is to give adequate opportunities for other BSS in the network to be evaluated and also prevent unforeseen fluctuations in the network.

4.0 Roaming Mechanism

When the roaming is to be triggered for a mobile client, two messages, association control request message and client steering request message are sent in sequence to agents in the network.

4.1 Association Control Request

The association control request message is sent to all agents in the network whose BSS is not the best BSS. Upon receiving the association control request message, the agents will add the provided client MAC address into their ignore list. This process will encourage the client to only associate with the target BSS because it will be the only BSS in the network which will reply to its probe request and association request.

4.2 Client Steering Request

Following the sending of association control request message, the controller will send a client steering request to the agent which the client to be processed for roaming is associated to. The agent is responsible for handling the client steering request and manages the client accordingly. If the client supports 11v, an 11v BTM request packet is first sent to the device. Should the client reject the 11v BTM request, a de-authentication packet will then be sent to the client. If the client does not support 11v then a de-authentication packet will be sent immediately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing client steering control in a multi-access point (AP) network, the method comprising:
   utilizing a controller of a controller-agent-client architecture of the multi-AP network to obtain multiple metrics from interactions between at least one portion of multiple logical entities of the controller-agent-client architecture, wherein the multiple logical entities comprise the controller, multiple agents, and multiple clients, and said at least one portion of the multiple logical entities comprises the controller and the multiple agents;
   calculating Basic Service Set (BSS) scores of a set of BSSs according to the multiple metrics, respectively, for selecting a best BSS from the set of BSSs according to the BSS scores, wherein any BSS of the set of BSSs comprises an AP equipped with an agent and a non-AP station (STA) playing a role of a client, and multiple factors of the BSS score of said any BSS comprise a received signal strength indicator (RSSI) metric and a path metric; and
   in response to a time measurement count reaching a predetermined threshold, utilizing the controller to trigger at least one operation related to at least the agents, to allow the best BSS to be selected as a target BSS for roaming, thereby enhancing overall performance of the multi-AP network, wherein the time measurement count corresponds to a length of time that the best BSS keeps having a highest score of the BSS scores.

2. The method of claim 1, further comprising:
   updating a metric database according to the multiple metrics, to make the metric database comprise the multiple metrics, for use of calculating the BSS scores.

3. The method of claim 2, wherein the multiple metrics comprises 11k measurement metrics according to IEEE 802.11k specification.

4. The method of claim 1, wherein the multiple factors of the BSS score further comprise a channel utilization metric.

5. The method of claim 1, wherein the multiple factors of the BSS score further comprise a station number metric.

6. The method of claim 1, wherein the multiple factors of the BSS score further comprise a station throughput metric.

7. The method of claim 1, wherein the BSS score is a linear combination of the multiple factors; and calculating the BSS scores of the set of BSSs according to the multiple metrics respectively further comprises:
   multiplying the multiple factors and respective weightages thereof to generate multiple products, respectively, and calculating a summation of the multiple products to be the BSS score.

8. The method of claim 1, wherein the RSSI metric and the path metric indicate a signal strength at the client and a total distance on a transmission path in the controller-agent-client architecture, respectively.

9. The method of claim 1, wherein said at least one portion of the multiple logical entities further comprises the multiple clients.

10. The method of claim 1, wherein the controller and a first agent of the multiple agents are implemented within a wireless communications device in the multi-AP network to form one of multiple APs in the multi-AP network, and another agent of the multiple agents is implemented within another wireless communications device in the multi-AP network to form another of the multiple APs, wherein the multiple APs comprise the AP.

11. An apparatus for performing client steering control in a multi-access point (AP) network, the apparatus comprising:
- a processing circuit, positioned in a wireless communications device, arranged to control operations of the wireless communications device, wherein the processing circuit comprise multiple modules respectively corresponding to multiple functions of the wireless communications device, and the multiple modules comprise:
  - a controller of a controller-agent-client architecture of the multi-AP network, wherein multiple logical entities of the controller-agent-client architecture comprise the controller, multiple agents, and multiple clients; and
  - a first agent of the multiple agents, wherein the controller and the first agent are implemented within the wireless communications device in the multi-AP network to form one of multiple APs in the multi-AP network;

wherein:
- the processing circuit utilizes the controller to obtain multiple metrics from interactions between at least one portion of the multiple logical entities, wherein said at least one portion of the multiple logical entities comprises the controller and the multiple agents;
- the processing circuit calculates Basic Service Set (BSS) scores of a set of BSSs according to the multiple metrics, respectively, for selecting a best BSS from the set of BSSs according to the BSS scores, wherein any BSS of the set of BSSs comprises an AP equipped with an agent and a non-AP station (STA) playing a role of a client, and multiple factors of the BSS score of said any BSS comprise a received signal strength indicator (RSSI) metric and a path metric; and
- in response to a time measurement count reaching a predetermined threshold, the processing circuit utilizes the controller to trigger at least one operation related to at least the agents, to allow the best BSS to be selected as a target BSS for roaming, thereby enhancing overall performance of the multi-AP network, wherein the time measurement count corresponds to a length of time that the best BSS keeps having a highest score of the BSS scores.

12. The apparatus of claim 11, wherein the processing circuit updates a metric database according to the multiple metrics, to make the metric database comprise the multiple metrics, for use of calculating the BSS scores.

13. The apparatus of claim 12, wherein the multiple metrics comprises 11k measurement metrics according to IEEE 802.11k specification.

14. The apparatus of claim 11, wherein the multiple factors of the BSS score further comprise a channel utilization metric.

15. The apparatus of claim 11, wherein the multiple factors of the BSS score further comprise a station number metric.

16. The apparatus of claim 11, wherein the multiple factors of the BSS score further comprise a station throughput metric.

17. The apparatus of claim 11, wherein the BSS score is a linear combination of the multiple factors; and the processing circuit multiplies the multiple factors and respective weightages thereof to generate multiple products, respectively, and calculates a summation of the multiple products to be the BSS score.

18. The apparatus of claim 11, wherein the RSSI metric and the path metric indicate a signal strength at the client and a total distance on a transmission path in the controller-agent-client architecture, respectively.

19. The apparatus of claim 11, wherein said at least one portion of the multiple logical entities further comprises the multiple clients.

20. The apparatus of claim 11, wherein another agent of the multiple agents is implemented within another wireless communications device in the multi-AP network to form another of the multiple APs, wherein the multiple APs comprise the AP.

* * * * *